(12) United States Patent
Bang

(10) Patent No.: US 11,513,192 B2
(45) Date of Patent: Nov. 29, 2022

(54) LIDAR SIGNAL PROCESSING APPARATUS AND METHOD

(71) Applicant: HYUNDAI MOBIS CO., LTD., Seoul (KR)

(72) Inventor: Sung Hoon Bang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 971 days.

(21) Appl. No.: 16/168,631

(22) Filed: Oct. 23, 2018

(65) Prior Publication Data

US 2019/0120937 A1  Apr. 25, 2019

(30) Foreign Application Priority Data

Oct. 25, 2017  (KR) .......................... 10-2017-0139381

(51) Int. Cl.
  *G01C 3/08*  (2006.01)
  *G01S 7/48*  (2006.01)
  (Continued)

(52) U.S. Cl.
  CPC .......... *G01S 7/4808* (2013.01); *G01S 7/4861* (2013.01); *G01S 17/10* (2013.01)

(58) Field of Classification Search
  CPC ...... G01S 7/4808; G01S 7/4861; G01S 17/10; G01S 17/894
  See application file for complete search history.

(56) References Cited

U.S. PATENT DOCUMENTS 4,837,575 A * 6/1989 Conner, Jr. ............. G01S 17/74
                                                       342/45
5,027,658 A * 7/1991 Anderson ........... G01S 15/8997
                                                       73/625
(Continued)

FOREIGN PATENT DOCUMENTS

DE       41 41 468 C2    6/1993
EP       2 963 445 A2    1/2016
(Continued)

OTHER PUBLICATIONS

Office Action issued in corresponding German Patent Application No. 102018218284.1 dated Feb. 11, 2022, with English translation.

*Primary Examiner* — Samantha K Nickerson
(74) *Attorney, Agent, or Firm* — Morgan, Lewis & Bockius LLP

(57) ABSTRACT

Provided are a LIDAR signal processing apparatus and a LIDAR signal processing method. The LIDAR signal processing apparatus comprises: an inherent history pulse wave applying unit for applying a first pulse wave combination to a laser diode, the first pulse wave combination having an inherent history which includes a combination of an inherent pulse period and an inherent pulse variation value; a received history detecting unit for detecting a received signal period and a received signal variation value of a reflected wave received by a photodiode; an inherent pulse wave discriminating unit for deciding whether or not the received signal period and the received signal variation value coincide with the inherent history; and an effective data processing unit for measuring a distance using effective data when the received signal period and the received signal variation value coincide with the inherent history.

8 Claims, 3 Drawing Sheets

(51) Int. Cl.
  *G01S 7/4861* (2020.01)
  *G01S 17/10* (2020.01)

(56) References Cited

U.S. PATENT DOCUMENTS

| | | | | |
|---|---|---|---|---|
| 7,342,651 | B1* | 3/2008 | Woolfson | G01S 7/484 |
| | | | | 356/28 |
| 7,982,861 | B2* | 7/2011 | Abshire | H04L 25/4902 |
| | | | | 356/5.11 |
| 9,091,754 | B2* | 7/2015 | d'Aligny | G01S 17/10 |
| 10,466,342 | B1* | 11/2019 | Zhu | G01S 17/10 |
| 10,613,223 | B2* | 4/2020 | Zuffada | G01S 7/487 |
| 10,830,880 | B2* | 11/2020 | Subasingha | G01S 17/10 |
| 2002/0131035 | A1* | 9/2002 | Watanabe | G01S 7/4915 |
| | | | | 356/5.1 |
| 2004/0033616 | A1* | 2/2004 | Le | G01N 21/4795 |
| | | | | 436/164 |
| 2009/0010644 | A1* | 1/2009 | Varshneya | G01S 7/481 |
| | | | | 398/33 |
| 2011/0292498 | A1* | 12/2011 | Chann | G03F 7/7085 |
| | | | | 359/341.1 |
| 2013/0050676 | A1* | 2/2013 | d'Aligny | G01S 7/484 |
| | | | | 356/5.01 |
| 2013/0258312 | A1* | 10/2013 | Lewis | G01S 7/4865 |
| | | | | 356/4.01 |
| 2015/0301177 | A1* | 10/2015 | Tsukamoto | G01S 7/4863 |
| | | | | 356/5.03 |
| 2016/0003946 | A1* | 1/2016 | Gilliland | G01S 17/10 |
| | | | | 356/5.01 |
| 2017/0016981 | A1* | 1/2017 | Hinderling | G01S 17/26 |
| 2017/0090031 | A1 | 3/2017 | Bondy et al. | |
| 2017/0234977 | A1* | 8/2017 | Kim | G01S 17/10 |
| | | | | 356/5.01 |
| 2017/0254883 | A1* | 9/2017 | Hamel | G01S 7/487 |
| 2017/0365979 | A1* | 12/2017 | Van Der Tempel | H02M 3/158 |
| 2021/0149028 | A1* | 5/2021 | Gong | G01S 7/4815 |

FOREIGN PATENT DOCUMENTS

| | | |
|---|---|---|
| KR | 10-2017-0083373 A | 7/2017 |
| KR | 10-2017-0096723 A | 8/2017 |

* cited by examiner

LIDAR SIGNAL PROCESSING APPARATUS AND METHOD

CROSS-REFERENCE TO RELATED PATENT APPLICATIONS

This application claims the benefit of Korean Patent Application No. 10-2017-0139381, filed on Oct. 25, 2017 in the Korean Intellectual Property Office, the disclosure of which is incorporated herein in its entirety by reference.

BACKGROUND

Field

The present invention may relate to a LIDAR signal processing apparatus and a LIDAR signal processing method, and may more particularly relate to a LIDAR signal processing apparatus and a LIDAR signal processing method which can accurately measure a distance to a measurement object using an optical means.

Description of the Related Art

LIDAR (Light Detection and Ranging) refers to detecting an object using light and measuring a distance to the object. LIDAR is similar in function to RADAR (Radio Detection and Ranging), but different therefrom in that it uses light, whereas RADAR uses radio wave. Thus, it is called 'Optical RADAR' as well. LIDAR has advantageous features such as better azimuth resolution and distance resolution than RADAR due to the difference in Doppler effect between light and microwave.

In LIDAR devices, airborne LIDAR devices have become mainstream, in which a satellite or an aircraft emits laser pulses and a ground observation station receives the pulses backscattered by particles in the atmosphere. These airborne LIDAR devices have been used to measure wind information as well as the existence and movement of dusts, smoke, aerosols, cloud particles, etc., and used to analyze the distribution of dust particles in the air or the degree of air pollution. However, recently, terrestrial LIDAR devices, in which both transmitting and receiving systems are installed on the ground to carry out such functions as obstacle detection, topographical modeling and position acquisition to an object, is being actively studied in consideration of appliances for military industries such as surveillance and reconnaissance robots, combat robots, unmanned naval vessels, unmanned helicopters or the like, or for civilian industries such as mobile robots for civilian demands, intelligent cars, unmanned vehicles or the like.

Generally, the terrestrial LIDAR devices include a laser diode for emitting a laser pulse wave, a photodiode for receiving a reflected wave reflected by an external object, and a processor for determining the position of the object. In this configuration, the processor calculates the distance to the object that reflects light by determining the time duration required for transmitting and receiving the reflected wave, and particularly calculates the distance with respect to the reflected wave received from each direction, thereby making it possible to create a distance map in the range of the image corresponding to a field of view.

However, there were such problems in the LIDAR devices that since they used a technique of emitting light and analyzing signals from the reflected light, the signals from the generated and received light were very sensitive to effects of environmental conditions. That is, when mutual interference occurs due to strong sunlight or laser pulse waves emitted from other neighboring LIDAR devices, they erroneously determine that there is no object by not recognizing the existence of the object or that there is an object by recognizing a false object which does not exist.

SUMMARY

The present invention has been made to solve various problems including the aforementioned problems, and aims to provide a LIDAR signal processing apparatus and a LIDAR signal processing method which can minimize mutual interference with strong sunlight or laser pulse waves emitted from other neighboring LIDAR devices by transmitting one or more laser pulse waves having a predefined inherent history and by receiving and processing reflected waves having a transmission history which coincides with the laser pulse waves having the inherent history. However, these objects are illustrative, and thus the scope of the present invention is not limited thereto.

According to one aspect of the present invention, a LIDAR signal processing apparatus may be provided. The LIDAR signal processing apparatus may comprise: an inherent history pulse wave applying unit for applying a first pulse wave combination to a laser diode, the first pulse wave combination having an inherent history which includes a combination of an inherent pulse period and an inherent pulse variation value; a received history detecting unit for detecting a received signal period and a received signal variation value of a reflected wave which is received from a photodiode; an inherent pulse wave discriminating unit for determining whether or not the received signal period and the received signal variation value coincide with the inherent history; and an effective data processing unit for measuring a distance using effective data when the received signal period and the received signal variation value coincide with the inherent history.

The LIDAR signal processing apparatus may further comprise a random constant output unit which outputs a random constant so that the inherent history can be changed whenever the vehicle is operated.

In the LIDAR signal processing apparatus, the random constant output unit may periodically change the random constant so that the inherent history can be randomly reset at regular intervals during the operation of the vehicle.

In the LIDAR signal processing apparatus, the inherent history may be randomly set and fixed when the vehicle is manufactured.

In the LIDAR signal processing apparatus, a time period from an ascending edge of a 1-1 pulse wave to an ascending edge of a 1-2 pulse wave, which are transmitted from the laser diode, may be applied as the inherent pulse period, and an ascending or descending ratio of the 1-2 pulse wave compared to the 1-1 pulse wave may be applied as the inherent pulse variation value.

In the LIDAR signal processing apparatus, the received history detecting unit may detect a time period from an ascending edge of a 1-1 reflected wave to an ascending edge of a 1-2 reflective wave, which are received by the photodiode, as the received pulse period, and may detect an ascending or descending ratio of the 1-2 reflected wave compared to the 1-1 reflected wave as the received pulse variation value.

In the LIDAR signal processing apparatus, the effective data processing unit may calculate a TOF (Time of flight) value using the time duration from the ascending edge of the 1-1 pulse wave transmitted by the laser diode to the ascending edge of the 1-1 reflective wave received by the photodiode.

In the LIDAR signal processing apparatus, the effective data processing unit may calculate a distance value to an object using the TOF value when the received signal period and the received signal variation value coincide with the inherent history.

In the LIDAR signal processing apparatus, the effective data processing unit may calculate N TOF values using an ascending edge signal of the 1-1 pulse wave transmitted by the laser diode and each ascending edge signal of the 1-1 reflected wave to a 1-N reflected wave received from the photodiode.

In the LIDAR signal processing apparatus, if the received signal period and the received signal variation value of the 1-N reflected wave and those of subsequent reflective waves coincide with the inherent history, the effective data processing unit may eliminate preceding TOF values prior to the Nth TOF value by considering the reflected waves received before the 1-N reflected wave as noises, and may calculate a distance value to an object using the Nth TOF value.

According to one aspect of the present invention, a LIDAR signal processing method may be provided. The LIDAR signal processing method may comprise: a first pulse wave generating step for applying a first pulse wave combination to a laser diode, the first pulse wave combination having an inherent history which includes a combination of an inherent pulse period and an inherent pulse variation value; a received history detecting step for detecting a received signal period and a received signal variation value of a reflected wave received from a photodiode; an inherent pulse wave discriminating step for determining whether or not the received signal period and the received signal variation value coincide with the inherent history; and an effective data processing step for measuring a distance using effective data when the received signal period and the received signal variation coincide with the inherent history.

In the LIDAR signal processing method, a random constant may be output in the first pulse wave generating step so that the inherent history can be randomly reset at regular intervals during operation of a vehicle.

According to an embodiment of the present invention as described above, it is possible to encrypt the transmitted and received signals, by transmitting one or more laser pulse waves having the predefined inherent history which includes a combination of the inherent pulse period and the inherent pulse variation value, and by receiving and processing only the reflected waves having the transmission history which coincides with the laser pulse waves having the inherent history.

In addition, by changing the inherent history of the transmitted laser pulse waves in a periodically random way, it is possible to provide such a LIDAR signal processing apparatus and a LIDAR signal processing method that can minimize mutual interference with strong sunlight or laser pulse waves emitted from other neighboring LIDAR devices. Of course, the scope of the present invention is not limited by these effects.

DETAILED DESCRIPTION

Figure 1:
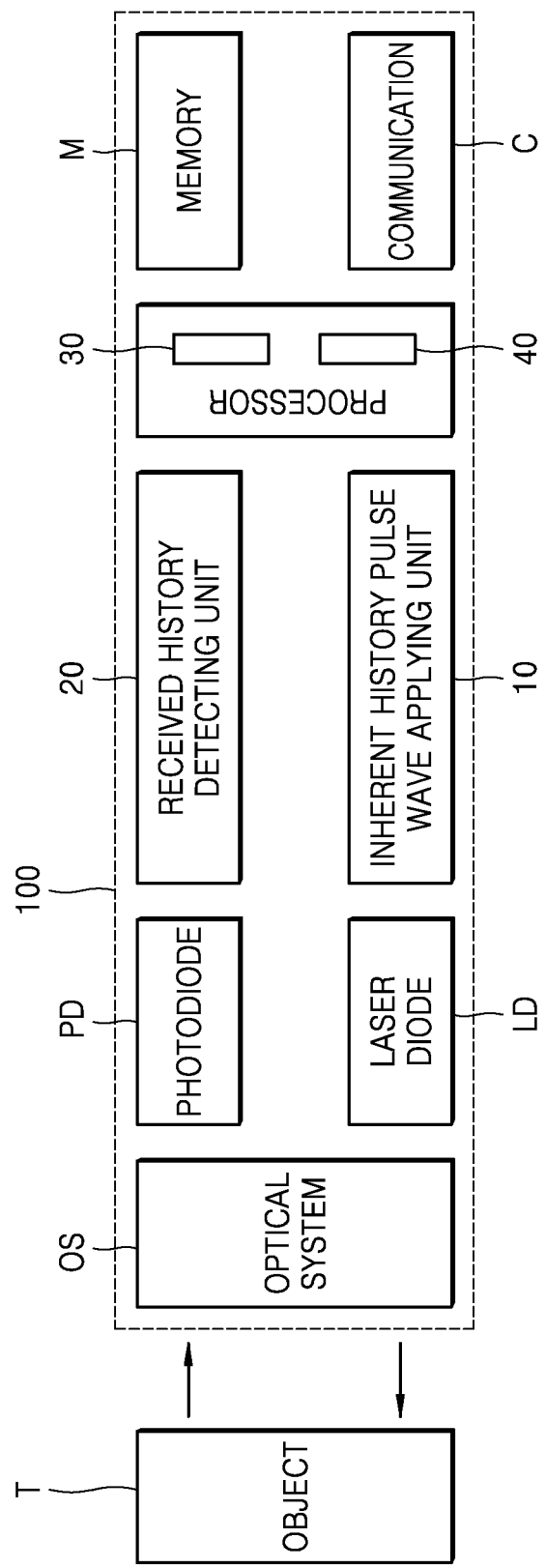
FIG. 1 is a schematic diagram for schematically showing a LIDAR signal processing apparatus according to an embodiment of the present invention.

Hereinafter, embodiments of the present invention will be described in detail with reference to the accompanying drawings.

It should be understood that since embodiments of the present invention are provided for more fully illustrating the present invention to those skilled in the art, the following embodiments may be modified in different forms and thus the scope of the present invention shall not be limited to these examples. Rather, these embodiments are provided to make the present disclosure more thorough and complete and to fully convey the spirit of the present invention to those skilled in the art. Also, in the drawings, the thickness and size of each layer may be exaggerated for convenience and clarity of explanation.

Hereinafter, embodiments of the present invention will be described with reference to the drawings schematically showing ideal embodiments of the present invention. In the figures, for example, variations in the shape shown may be expected, depending on the manufacturing technique and/or tolerances. Accordingly, it should be appreciated that embodiments of the spirit of the present invention shall not be construed as limited to any particular shape of the regions shown herein, but shall include, for example, variations in shape resulting from manufacturing.

Figure 2:
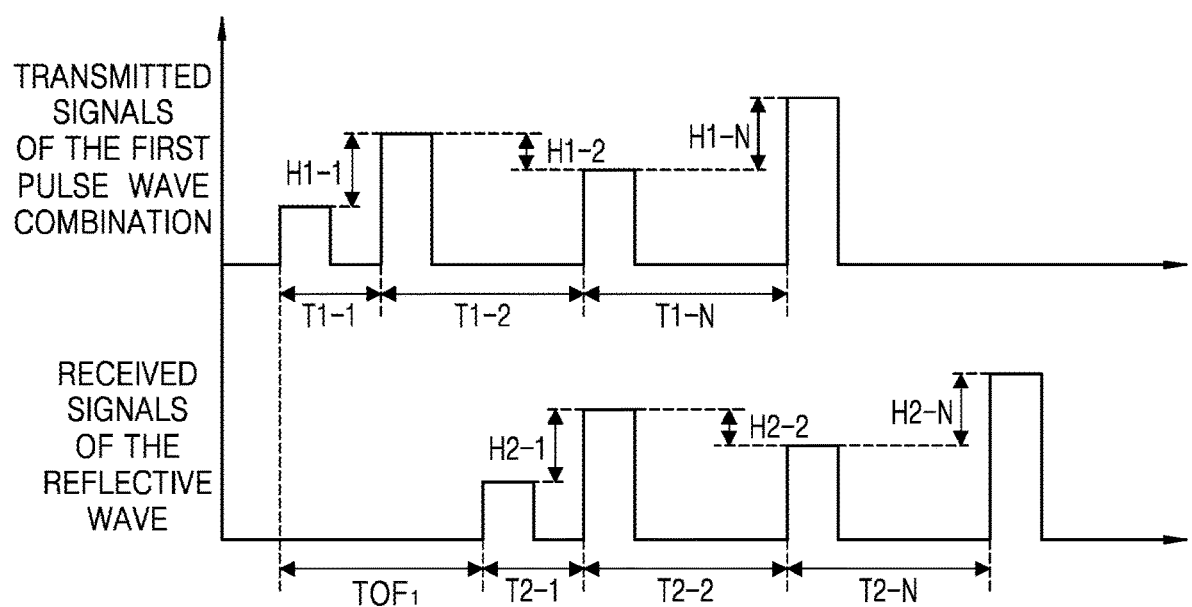
FIG. 2 and FIG. 3 are graphs for showing pulse waves of signals which are transmitted and received by the LIDAR signal processing apparatus 100 of FIG. 1.
Figure 3:
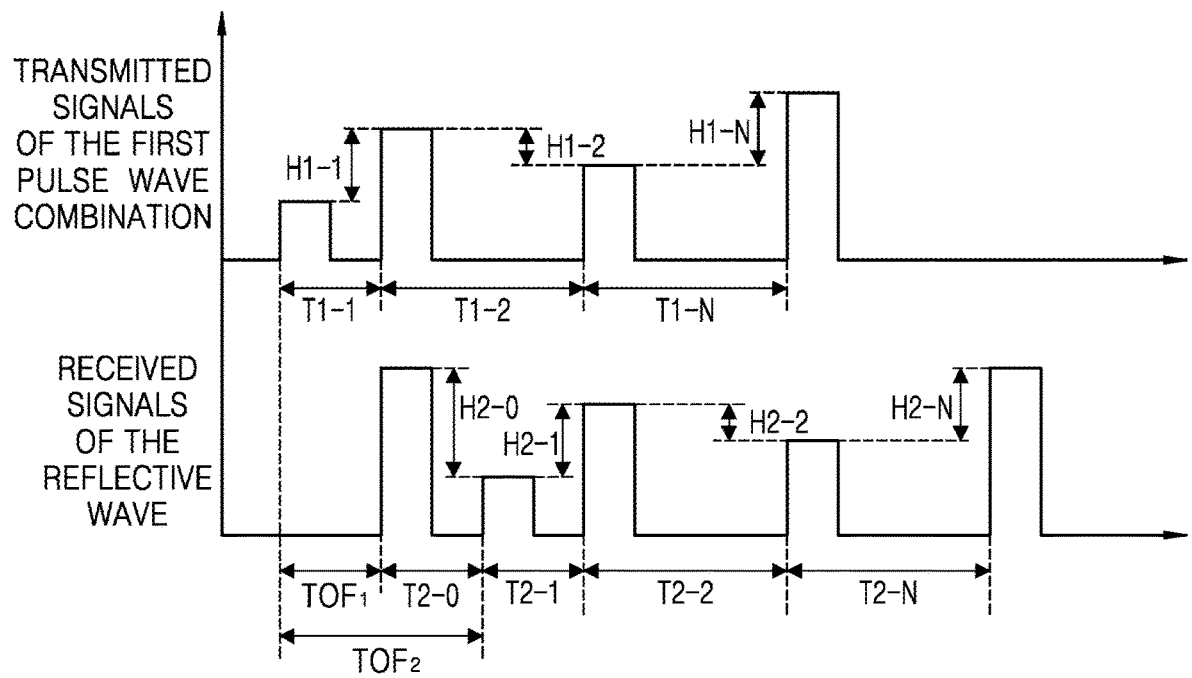

FIG. 1 is a schematic diagram for schematically showing a LIDAR signal processing apparatus 100 according to an embodiment of the present invention. FIG. 2 and FIG. 3 are graphs for showing pulse waves of signals which are transmitted and received by the LIDAR signal processing apparatus 100 of FIG. 1.

First, as shown in FIG. 1, the LIDAR signal processing apparatus 100 according to an embodiment of the present invention may generally include an inherent history pulse wave applying unit 10, a received history detecting unit 20, an inherent pulse wave discriminating unit 30, and an effective data processing unit 40.

As shown in FIG. 1, the inherent history pulse wave applying unit 10 may apply to the laser diode a first pulse wave combination having an inherent history which may include a combination of an inherent pulse period and an inherent pulse variation value.

More particularly, the inherent history pulse wave applying unit 10 may apply, as the inherent pulse period, a time period from an ascending edge of a 1-1 pulse wave, which is a pulse of the first pulse wave combination transmitted from a laser diode LD, to an ascending edge of a 1-2 pulse wave, which is the next pulse of the 1-1 pulse wave, and may also apply, as the inherent pulse variation value, an ascending or descending ratio of the 1-2 pulse wave compared to the 1-1 pulse wave.

For example, when the inherent history pulse wave applying unit 10 applies the first pulse wave combination to the laser diode LD in accordance with the inherent history which includes the inherent pulse period and the inherent pulse variation value, the laser diode LD may generate the first pulse wave combination having the inherent history. At this time, the inherent history may be stored in a memory M.

Here, the laser diode LD may be a semiconductor laser having two electrodes for activating the laser. More particularly, the laser diode LD may include three layers with a GaAs active layer interposed between $Al_xGa_{1-x}As$ layers. The refractive index n1 of GaAs and the refractive index n2 of $Al_xGa_{1-x}As$ may be designed to contain the light generated in the active layer, and the generated light may be emitted from a side face of the active layer. In addition, the thickness of the active layer may be made smaller than the wavelength of the light which is typically generated, and unlike the excitation caused by light or electrons, it is easy to handle because inversion distribution can be achieved only by flowing a current.

As mentioned above, the first pulse wave combination generated in the laser diode LD may be transmitted toward an object T through an optical system OS. More specifically, the optical system OS may be formed of a combination of a reflective mirror, a lens, and a prism for transmitting light energy using reflection and refraction of light.

Also, as shown in FIG. 1, the received history detecting unit 20 may detect a received signal period and a received signal variation value of the reflected wave that is received from the photodiode PD, and the inherent pulse wave discriminating unit 30 may determine whether or not the received signal period and the received signal variation value coincide with the inherent history.

More particularly, the received history detecting unit 20 may detect, as the received pulse period, a time period from an ascending edge of a 1-1 pulse wave, which is a pulse of the reflected wave received by the photodiode PD, to an ascending edge of a 1-2 pulse wave, which is the next pulse of the 1-1 pulse wave, and may also detect, as the received pulse variation value, an ascending or descending ratio of the 1-2 pulse wave compared to the 1-1 pulse wave. At this time, the received signal period and the received signal variation value may be stored in the memory M as a received history, and the inherent pulse wave discriminating unit 30 may receive the inherent history and the received history information from the memory M.

For example, as shown in FIG. 2, when the inherent history pulse wave applying unit 10 applies the first pulse wave combination having the inherent history to the laser diode LD, the laser diode LD may transmit the first pulse wave combination with N pulse waves.

In this case, the inherent history of the first pulse wave combination may include: a 1-1 pulse period that is a period value between a 1-1 pulse wave and a 1-2 pulse wave; a 1-2 pulse period that is a period value between the 1-2 pulse wave and a 1-3 pulse wave; a 1-N pulse period that is a period value between the 1-3 pulse wave and a 1-N pulse wave; a 1-1 pulse variation value that is an ascending or descending ratio between the 1-1 pulse wave and the 1-2 pulse wave; a 1-2 pulse variation value that is an ascending or descending ratio between the 1-2 pulse wave and the 1-3 pulse wave; and a 1-N pulse variation value that is an ascending or descending ratio between the 1-3 pulse wave and the 1-N pulse wave.

Subsequently, after a predetermined time, the reflected wave having N pulse waves may be received through the photodiode PD. At this time, the received history of the reflected wave may include: a 2-1 pulse period that is a period value between a 1-1 reflected wave and a 1-2 reflected wave; a 2-2 pulse period that is a period value between the 1-2 reflected wave and a 1-3 reflected wave; a 2-N pulse period that is a period value between the 1-3 reflected wave and a 1-N reflected wave; a 2-1 pulse variation value that is an ascending or descending ratio between the 1-1 reflected wave and the 1-2 reflected wave; a 2-2 pulse variation value that is an ascending or descending ratio between the 1-2 reflected wave and the 1-3 reflected wave; and a 2-N pulse variation value that is an ascending or descending ratio between the 1-3 reflected wave and the 1-N reflected wave.

Then, the inherent pulse wave discriminating unit 30 may compare the 1-1 pulse period, the 1-2 pulse period and the 1-N pulse period to the 2-1 pulse period, 2-2 Pulse period and 2-N pulse period, respectively, and also compare the 1-1 pulse variation value, the 1-2 pulse variation value and the 1-N pulse variation value to the 2-1 pulse variation value, the 2-2 pulse variation value and the 2-N pulse variation value, respectively. If both compared values are identical or their difference is within an allowable range of error, it can be decided that the inherent history and the received history coincide with each other.

Also, the effective data processing unit 40 may measure a distance using effective data when the received signal period and the received signal variation value of the received history coincide with the inherent history. More specifically, as shown in FIG. 2, the effective data processing unit 40 may calculate a TOF (Time of flight) value TOF1 using a time duration from the ascending edge of the 1-1 pulse wave of the first pulse combination transmitted from the laser diode LD to the ascending edge of the 1-1 reflective wave of the reflected waves received by the photodiode PD.

In this case, when the inherent pulse wave discriminating unit 30 determines that the received signal period and the received signal variation value of the received history coincide with those of the inherent history, the effective data processing unit 40 may calculate the distance value to the object T using the TOF value TOF1. In addition, by using a communication unit C, the calculated distance value may be transmitted to other parts of a vehicle such as a dashboard or a speaker so as to output the distance value information for a user to see it or to sound an alarm.

For example, the effective data processing unit 40 may modulate the time duration from the ascending edge of the 1-1 pulse wave of the first pulse combination transmitted from the laser diode LD to the ascending edge of the 1-1 reflective wave of the reflected waves received by the photodiode PD to a digital signal through TDC, calculate the TOF value TOF1 through a counter and store it in the memory M.

Here, the TOF value TOF1 may be calculated by the flight time distance measurement method. More specifically, the flight time distance measurement method may be based on the principle of calculating the distance by measuring the time difference between the reference time at which the 1-1 pulse wave of the first pulse wave combination is transmitted and the detected time at which the 1-1 reflective wave of the reflected waves, which is reflected on the object T and returned back, is detected.

This flight time distance measurement method has a merit that the distance can be measured without a distance ambiguity in a long area of several meters to several hundred kilometers, and it is relatively simple how to implement the method. Thus, it is applied to a groundborne or airborne geodetic survey field which is required for civil engineering, construction, urban development or the like, as well as three-dimensional shape measurement in a large manufacturing field such as shipbuilding industry and aircraft industry. In particular, it is also widely applied to a satellite laser tracking system SLR, a laser altimeter, and a distance measurement between satellites.

Further, the LIDAR signal processing apparatus 100 may include a random constant output unit and output a random constant such that the inherent history can be changed each time the vehicle is used. More specifically, according to the random constant output from the random constant output unit, the first pulse wave combination in which the inherent history is randomly changed in the inherent history pulse wave applying unit 10 may be applied to the laser diode LD.

In addition, the random constant output unit may change the random constant in a regular period during the operation of the vehicle, so that the inherent history can be randomly reset at regular intervals during the operation of the vehicle. Also, the random constant output unit may change the random constant in a period that is not constant during the operation of the vehicle, so that the inherent history can be randomly reset in an irregular period during the operation of the vehicle. However, the present invention is not limited to this type, and the inherent history may be randomly set and fixed when the vehicle is manufactured.

Also, as shown in FIG. 3, if the inherent history pulse wave applying unit 10 applies the first pulse wave combination having the inherent history to the laser diode LD, the laser diode LD may transmit the first pulse wave combination having N pulse waves.

More particularly, the effective data processing unit 40 may calculate N TOF values using the ascending edge signal of the 1-1 pulse wave transmitted from the laser diode LD and each ascending edge signal of the 1-1 reflected wave to the 1-N reflected wave received from the photodiode PD. At this time, if the received signal period and the received signal variation value beginning with the 1-N reflected wave coincide with the inherent history, the effective data processing unit 40 may eliminate the TOF values acquired prior to the Nth TOF value on the premise that the reflected waves acquired before the 1-N reflected wave are noises, and calculate the distance value to the object using the Nth TOF value.

For example, as shown in FIG. 3, the inherent history of the first pulse wave combination may include: a 1-1 pulse period that is a period value between a 1-1 pulse wave and a 1-2 pulse wave; a 1-2 pulse period that is a period value between the 1-2 pulse wave and a 1-3 pulse wave; a 1-N pulse period that is a period value between the 1-3 pulse wave and a 1-N pulse wave; a 1-1 pulse variation value that is an ascending or descending ratio between the 1-1 pulse wave and the 1-2 pulse wave; a 1-2 pulse variation value that is an ascending or descending ratio between the 1-2 pulse wave and the 1-3 pulse wave; and a 1-N pulse variation value that is an ascending or descending ratio between the 1-3 pulse wave and the 1-N pulse wave.

Subsequently, after a predetermined time, the reflected wave having N pulse waves may be received through the photodiode PD. At this time, the received history of the reflected wave may include: a 2-0 pulse period that is a period value between a 1-0 reflected wave and a 1-1 reflected wave; a 2-1 pulse period that is a period value between the 1-1 reflected wave and a 1-2 reflected wave; a 2-2 pulse period that is a period value between the 1-2 reflected wave and a 1-3 reflected wave; a 2-N pulse period that is a period value between the 1-3 reflected wave and a 1-N reflected wave; a 2-0 pulse variation value that is an ascending or descending ratio between the 1-0 reflected wave and the 1-1 reflected wave; a 2-1 pulse variation value that is an ascending or descending ratio between the 1-1 reflected wave and the 1-2 reflected wave; a 2-2 pulse variation value that is an ascending or descending ratio between the 1-2 reflected wave and the 1-3 reflected wave; and a 2-N pulse variation value that is an ascending or descending ratio between the 1-3 reflected wave and the 1-N reflected wave.

In this case, the 2-0 pulse period and the 2-0 pulse variation value do not coincide with the 1-1 pulse period and the 1-1 pulse variation value, respectively, the 1-1 pulse period, the 1-2 pulse period and the 1-N pulse period coincide with 2-1 pulse period, the 2-2 pulse period and the 2-N pulse period, respectively, and the 1-1 pulse variation value, the 1-2 pulse variation value and the 1-N pulse variation value coincide with the 2-1 pulse variation value, the 2-2 pulse variation value and the 2-N pulse variation value, respectively. Accordingly, the inherent pulse wave discriminating unit 30 may consider the 1-0 reflected wave as a noise resulting from mutual interference with strong sunlight or laser pulse waves emitted by other neighboring LIDAR devices, and discriminate the 1-1 reflective wave to 1-N reflected wave as effective data.

At this time, the effective data processing unit 40 may discard data of the TOF value TOF1, which is the time duration from the ascending edge of the 1-1 pulse wave of the first pulse wave combination transmitted from the laser diode LD to the ascending edge of the 1-0 reflected wave of the reflected waves received by the photodiode PD, and use the TOF value TOF2, which is the time duration from the ascending edge of the 1-1 pulse wave to the ascending edge of the 1-1 reflected wave as effective data.

Accordingly, the LIDAR signal processing apparatus 100 according to an embodiment of the present invention may transmit one or more laser pulse waves having the predefined inherent history including a combination of the inherent pulse period and the inherent pulse variation value, and may receive and process only the reflected waves having the transmission history which coincides with the laser pulse wave having the inherent history, so that the transmitted and received signals can be encrypted. In this case, it is possible to encrypt the transmitted and received signals at a higher level by randomly changing the inherent history of the transmitted laser pulse waves on a regular basis.

Therefore, the LIDAR signal processing apparatus 100 according to an embodiment of the present invention may Provide such effects that can minimize mutual interference with strong sunlight or laser pulse waves emitted from other neighboring LIDAR devices, and receive and process only reflected waves of the laser pulse waves emitted from its own LIDAR device, thereby processing the received signals quickly and accurately.

Figure 4:
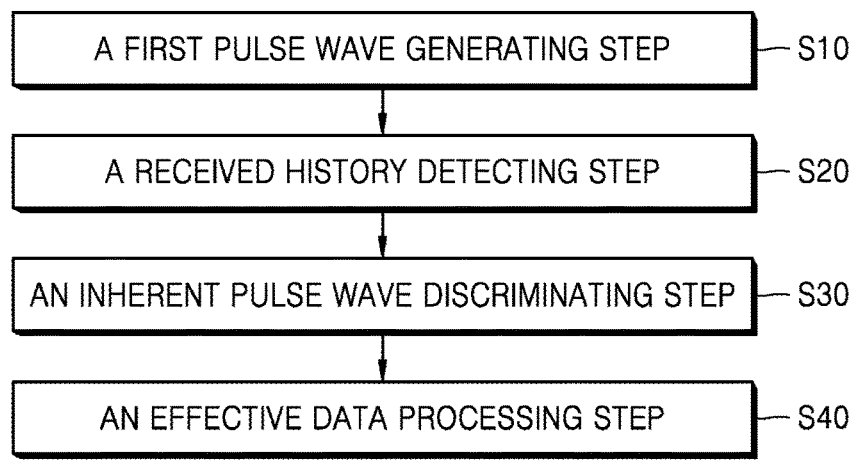
FIG. 4 is a flowchart for schematically showing a LIDAR signal processing method according to an embodiment of the present invention.

FIG. 4 is a flowchart for schematically showing a LIDAR signal processing method according to an embodiment of the present invention.

As shown in FIG. 4, the LIDAR signal processing method according to an embodiment of the present invention may include: a first pulse wave generating step S10 for applying a first pulse wave combination having an inherent history, which includes a combination of an inherent pulse period and an inherent pulse variation value, to a laser diode LD; a received history detecting step S20 for detecting a received signal period and a received signal variation value of a reflected wave received from a photodiode PD; an inherent pulse wave discriminating step S30 for deciding whether the received signal period and the received signal variation value coincide with the inherent history or not; and an effective data processing step S40 for measuring a distance using effective data when the received signal period and the received signal variation value coincide with the inherent history.

In this case, in order to encrypt the transmitted and received signals at a higher level, a random constant may be output in the first pulse wave generating step S10 so that the inherent history can be randomly reset at regular intervals during operation of a vehicle.

More specifically, the random constant output unit may output an arbitrarily random constant, and the inherent history pulse wave applying unit 10 may generate the first pulse wave combination having an arbitrarily random inherent history by reflecting the random constant. Then, the generated first pulse wave combination may be transmitted toward the object T through the laser diode LD.

Subsequently, the transmitted first pulse wave combination may be reflected by the object T to generate the reflected wave, and the reflected wave may be received by the photodiode PD. At this time, the received history detecting unit 20 may detect the received history which includes the received signal period and the received signal variation value of the received reflected wave.

Then, the inherent pulse wave discriminating unit 30 may compare the 1-1 pulse period, the 1-2 pulse period and the 1-N pulse period of the first pulse wave combination to the 2-1 pulse period, 2-2 Pulse period and 2-N pulse period of the reflected wave, respectively, and also compare the 1-1 pulse variation value, the 1-2 pulse variation value and the 1-N pulse variation value of the first pulse wave combination to the 2-1 pulse variation value, the 2-2 pulse variation value and the 2-N pulse variation value of the reflected wave, respectively. If both compared values are identical or their difference is within an allowable range of error, it can be decided that the inherent history and the received history coincide with each other. Thus, when the inherent history of the first pulse wave combination and the received history of the reflected wave are identical, the reflected wave can be considered to be reliable.

In this case, the effective data processing unit 40 may calculate a TOF (time of flight) value TOF1 by using the time duration from the ascending edge of the 1-1 pulse wave of the first pulse combination to the ascending edge of the 1-1 reflective wave of the reflected wave. If it is determined that the reflected wave is reliable, the distance to the object T can be accurately calculated using the TOF value TOF1 finally.

Accordingly, the LIDAR signal processing method according to an embodiment of the present invention may transmit one or more laser pulse waves having the predefined inherent history including a combination of the inherent pulse period and the inherent pulse variation value, and may receive and process only the reflected waves having the transmission history which coincides with the laser pulse wave having the inherent history, so that the transmitted and received signals can be encrypted. In this case, the transmitted and received signals can be encrypted at a much higher level by changing the inherent history of the transmitted laser pulse waves in a periodically random way.

Therefore, the LIDAR signal processing method according to an embodiment of the present invention may provide such effects that can minimize mutual interference with strong sunlight or the laser pulse waves emitted from other neighboring LIDAR devices, and may receive and process only reflected waves of the laser pulse waves emitted from their own LIDAR device, thereby processing the received signals in a quick and accurate way.

While the present invention has been described with reference to embodiments, it should be understood that the embodiments are merely illustrative and various modifications and other equivalent embodiments may be made from those by one skilled in the art. Accordingly, the genuine scope of the present invention should be determined by the technical idea of the appended claims.

What is claimed is:

1. A LIDAR signal processing apparatus, comprising:
an inherent history pulse wave generator generating a first pulse wave combination, the first pulse wave combination having an inherent history which includes a combination of an inherent pulse period and an inherent pulse variation value, and applying the first pulse wave combination to a laser diode;
a random constant output unit which outputs a random constant so that the inherent history can be changed whenever a vehicle including the LIDAR signal processing apparatus is operated;
the laser diode transmitting the first pulse wave combination including at least three pulse waves;
a photodiode receiving at least three reflected waves from the first pulse wave combination reflected by an external object;
a received history detector detecting a received signal period and a received signal variation value of the reflected waves that are reflected by the external object;
an inherent pulse wave discriminating unit for deciding whether or not the received signal period and the received signal variation value coincide with the inherent history; and
an effective data processing unit for measuring a distance using effective data when the received signal period and the received signal variation value coincide with the inherent history wherein the effective data processing unit calculates at least three TOF (Time of flight) values using time duration from an ascending edge of the first pulse wave transmitted by the laser diode and each ascending edge signal of the reflected waves,
wherein if the received signal period and the received signal variation value of a Nth(N is an integer greater than or equal to 1) reflected wave and those of subsequent reflected waves coincide with the inherent history, the effective data processing unit eliminates preceding TOF values prior to the Nth TOF value by considering the reflected waves received before the Nth reflected wave as noises, and calculates a distance value to an object using the Nth TOF value, and
wherein a time period between ascending edges of the pulse waves which are transmitted from the laser diode is applied as the inherent pulse period, and ascending or descending ratio of the pulse waves which are transmitted from the laser diode as the inherent pulse variation value.

2. The LIDAR signal processing apparatus according to claim 1,
wherein the random constant output unit periodically changes the random constant so that the inherent history can be randomly reset at regular intervals during the operation of the vehicle.

3. The LIDAR signal processing apparatus according to claim 1,
wherein the inherent history is randomly set and fixed when the vehicle including the LIDAR signal processing apparatus is manufactured.

4. The LIDAR signal processing apparatus according to claim 1,
wherein a time period from an ascending edge of a 1-1 pulse wave to an ascending edge of a 1-2 pulse wave, which are transmitted from the laser diode, is applied as the inherent pulse period, and an ascending or descending ratio of the 1-2 pulse wave compared to the 1-1 pulse wave is applied as the inherent pulse variation value, and wherein the first pulse wave includes the 1-1 pulse wave and the 1-2 pulse wave.

5. The LIDAR signal processing apparatus according to claim 4, wherein the received history detector detects a time period from an ascending edge of a 1-1 reflected wave to an ascending edge of a 1-2 reflected wave, which are received by the photodiode, as the received pulse period, and detects an ascending or descending ratio of the 1-2 reflected wave compared to the 1-1 reflected wave as the received pulse variation value, and wherein the 1-1 reflected wave and the 1-2 reflected wave are one of the reflected waves.

6. The LIDAR signal processing apparatus according to claim 5, wherein the effective data processing unit calculates a TOF (Time of flight) value using time duration from the ascending edge of the 1-1 pulse wave transmitted by the laser diode to the ascending edge of the 1-1 reflected wave received by the photodiode.

7. The LIDAR signal processing apparatus according to claim 6, wherein the effective data processing unit calculates a distance value to an object using the TOF value when the received signal period and the received signal variation value coincide with the inherent history.

8. A LIDAR signal processing method, comprising:

a first pulse wave generating step, for applying a first pulse wave combination to a laser diode, the first pulse wave combination having an inherent history which includes a combination of an inherent pulse period and an inherent pulse variation value;

a received history detecting step, for detecting a received signal period and a received signal variation value of a reflected wave received from a photodiode;

an inherent pulse wave discriminating step, for determining whether or not the received signal period and the received signal variation value coincide with the inherent history; and an effective data processing step, for measuring a distance using effective data when the received signal period and the received signal variation coincide with the inherent history, and wherein the first pulse wave combination includes at least three pulse waves, wherein a random constant is output in the first pulse wave generating step so that the inherent history can be randomly reset at regular intervals during operation of a vehicle;

wherein the photodiode receives at least three reflected waves from the first pulse wave combination reflected by an external object;

wherein the effective data processing step includes, calculating at least three TOF (Time of flight) values using time duration from the ascending edge of a first pulse wave combination transmitted by the laser diode and each ascending edge signal of the reflected waves, wherein if the received signal period and the received signal variation value of a Nth(N is an integer greater than or equal to 1) reflected wave and those of subsequent reflected waves coincide with the inherent history, the effective data processing unit eliminates preceding TOF values prior to the Nth TOF value by considering the reflected waves received before the Nth reflected wave as noises, and calculates a distance value to an object using the Nth TOF value, wherein a time period between ascending edges of the pulse waves which are transmitted from the laser diode is applied as the inherent pulse period, and ascending or descending ratio of the pulse waves which are transmitted from the laser diode as the inherent pulse variation value.

* * * * *